(12) United States Patent
Ishida

(10) Patent No.: US 10,501,653 B2
(45) Date of Patent: Dec. 10, 2019

(54) PRETREATMENT LIQUID, INK SET, AND RECORDING METHOD

(71) Applicant: Seiko Epson Corporation, Tokyo (JP)

(72) Inventor: Kohei Ishida, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/913,097

(22) Filed: Mar. 6, 2018

(65) Prior Publication Data

US 2018/0282567 A1 Oct. 4, 2018

(30) Foreign Application Priority Data

Mar. 28, 2017 (JP) ................................ 2017-063134

(51) Int. Cl.

| C09D 11/54 | (2014.01) |
| D06P 5/30 | (2006.01) |
| D06P 1/52 | (2006.01) |
| D06P 1/54 | (2006.01) |
| D06P 1/642 | (2006.01) |
| B41J 3/407 | (2006.01) |
| C09D 11/322 | (2014.01) |
| D06P 1/44 | (2006.01) |

(52) U.S. Cl.
CPC ............. *C09D 11/54* (2013.01); *B41J 3/4078* (2013.01); *C09D 11/322* (2013.01); *D06P 1/445* (2013.01); *D06P 1/5285* (2013.01); *D06P 1/54* (2013.01); *D06P 1/6424* (2013.01); *D06P 5/30* (2013.01); *D06P 1/525* (2013.01); *D06P 1/5221* (2013.01)

(58) Field of Classification Search
CPC ......... C09D 11/54; C09D 11/322; D06P 5/30; D06P 1/5285; D06P 1/54; D06P 1/6424; B41J 3/4078
See application file for complete search history.

(56) References Cited

U.S. PATENT DOCUMENTS

| 4,119,398 A | 10/1978 | Purser |
| 5,601,746 A | 2/1997 | Danner et al. |
| 2007/0011819 A1 | 1/2007 | DeVries et al. |
| 2011/0169901 A1 | 7/2011 | Pinto et al. |
| 2014/0186533 A1 | 7/2014 | Kitagawa et al. |
| 2014/0308447 A1* | 10/2014 | Sarkisian ............. B41M 5/0011 427/261 |

FOREIGN PATENT DOCUMENTS

| EP | 2 390 406 A1 | 11/2011 |
| JP | 2009-215686 A | 9/2009 |
| JP | 2010-188597 A | 9/2010 |
| WO | WO-2014-014453 A1 | 1/2014 |
| WO | WO-2014-168600 A2 | 10/2014 |

OTHER PUBLICATIONS

Extended European Search Report for Application No. EP 18 16 2499 dated Aug. 20, 2018 (8 pages).

* cited by examiner

*Primary Examiner* — Lamson D Nguyen

(74) *Attorney, Agent, or Firm* — Harness, Dickey & Pierce, P.L.C.

(57) ABSTRACT

A pretreatment liquid for use in ink jet pigment textile printing contains at least one of a resin dispersion and a cross-linker, a lubricant, and water.

19 Claims, 1 Drawing Sheet

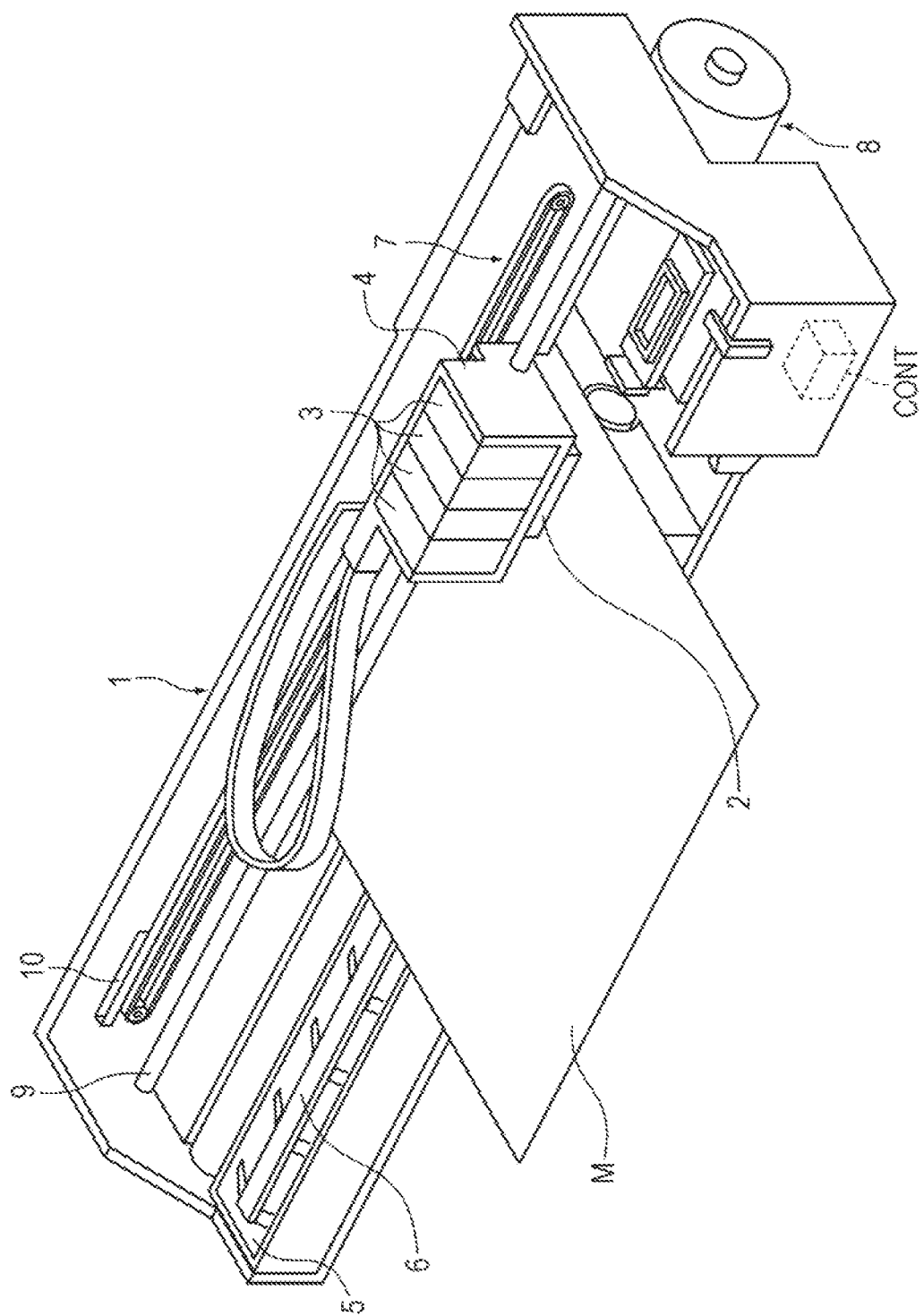

PRETREATMENT LIQUID, INK SET, AND RECORDING METHOD

BACKGROUND

1. Technical Field

The present invention relates to a pretreatment liquid, an ink set, and a recording method.

2. Related Art

A recording method includes ejecting ink droplets from a fine nozzle to deposit the ink droplets on a recording medium. Such a method can record high-resolution and high-quality images at high speed with a relatively inexpensive apparatus. Such a recording method requires numerous considerations, such as the properties of inks to be used, recording stability, and image quality. Thus, not only ink jet recording apparatuses but also ink compositions to be used are extensively studied.

A recording method is also used for dyeing (textile printing) of textiles. Textiles (woven fabrics and nonwoven fabrics) have been recorded by a screen textile printing method or a roller textile printing method. Due to the advantages of high-mix low-volume production and immediate printing, however, recording methods are studied.

Pigment textile printing, which is textile printing using an ink composition blended with a pigment and a resin fixative, is also studied. It is important in pigment textile printing to physically fix a pigment to textile fibers, and various studies have been conducted to improve not only the scratch resistance and color developability but also fastness of printed textiles (for example, JP-A-2010-188597).

However, it is difficult to improve fastness only with an ink composition. The present inventor has found that the use of a pretreatment liquid containing a cross-linker or a resin fixative before deposition of an ink composition on textiles is effective in improving friction fastness. However, it was found that although wet friction fastness was somewhat improved, dry friction fastness was insufficient.

SUMMARY

Accordingly, some aspects of the invention solve at least part of the problems by providing a pretreatment liquid, an ink set, and a recording method that can produce a printed textile with wet friction fastness and dry friction fastness by ink jet pigment textile printing.

The invention has been achieved to solve at least part of the problems described above and can be implemented in accordance with the following aspects or application examples.

Application Example 1

A pretreatment liquid for use in ink jet pigment textile printing according to an aspect of the invention contains at least one of a resin dispersion and a cross-linker, a lubricant, and water.

The pretreatment liquid according to Application Example 1 containing at least one of a resin dispersion and a cross-linker, a lubricant, water can be used as a pretreatment liquid to produce a printed textile with wet friction fastness and dry friction fastness by ink jet pigment textile printing.

Application Example 2

The application example may further contain a cationic compound, wherein the cationic compound may be any one selected from the group consisting of polyvalent metal salts, cationic polymers, and cationic surfactants.

In Application Example 2, the cationic compound selected from the group consisting of polyvalent metal salts, cationic polymers, and cationic surfactants reacts with a component of the ink composition and aggregates in ink jet pigment textile printing, thereby improving the color developability of a printed textile.

Application Example 3

In the application example, the resin dispersion may be any one selected from the group consisting of nonionic dispersions, cationic dispersions, and emulsifier-dispersible anionic dispersions.

In Application Example 3, the resin dispersion selected from the group consisting of nonionic dispersions, cationic dispersions, and emulsifier-dispersible anionic dispersions is less reactive to the other components of the pretreatment liquid and thereby improves the stability of the pretreatment liquid. Thus, a printed textile with wet friction fastness and dry friction fastness can be produced in ink jet pigment textile printing.

Application Example 4

In the application example, the cross-linker may be any one selected from the group consisting of nonionic dispersions, cationic dispersions, and emulsifier-dispersible anionic dispersions.

In Application Example 4, the cross-linker selected from the group consisting of nonionic dispersions, cationic dispersions, and emulsifier-dispersible anionic dispersions is less reactive to the other components of the pretreatment liquid and thereby improves the stability of the pretreatment liquid. Thus, a printed textile with wet friction fastness and dry friction fastness can be produced in ink jet pigment textile printing.

Application Example 5

In the application example, the lubricant may be any one selected from the group consisting of nonionic dispersions, cationic dispersions, and emulsifier-dispersible anionic dispersions.

In Application Example 5, the lubricant selected from the group consisting of nonionic dispersions, cationic dispersions, and emulsifier-dispersible anionic dispersions is less reactive to the other components of the pretreatment liquid and thereby improves the stability of the pretreatment liquid. Thus, a printed textile with wet friction fastness and dry friction fastness can be produced in ink jet pigment textile printing.

Application Example 6

In the application example, the resin dispersion may have a solid content of 10% or less by mass based on the total mass of the pretreatment liquid.

In Application Example 6, the resin dispersion having a solid content of 10% or less by mass based on the total mass of the pretreatment liquid can improve the feel and texture of a printed textile.

Application Example 7

An ink set according to an aspect of the invention contains the pretreatment liquid according to any one of Application Examples 1 to 6 and an ink composition containing a pigment.

In Application Example 7, an ink set containing the pretreatment liquid according to the application example can be used to produce a printed textile with wet friction fastness and dry friction fastness by ink jet pigment textile printing.

Application Example 8

A recording method according to an aspect of the invention includes applying the pretreatment liquid according to any one of Application Examples 1 to 6 to a textile and applying by an ink jet method an ink composition containing a pigment to a region of the textile to which the pretreatment liquid is applied.

In Application Example 8, the pretreatment liquid according to the application example can be used to produce a printed textile with wet friction fastness and dry friction fastness by ink jet pigment textile printing.

Application Example 9

In the application example, the pretreatment liquid may be applied by an ink jet method.

In Application Example 9, the pretreatment liquid can be applied uniformly to a textile by the ink jet method, thereby improving the color development of a printed textile and maintaining the feel and texture of the textile.

BRIEF DESCRIPTION OF THE DRAWINGS

The invention will be described with reference to the accompanying drawings, wherein like numbers reference like elements.

FIGURE is a schematic perspective view of a recording apparatus that performs a recording method according to an embodiment of the invention.

DESCRIPTION OF EXEMPLARY EMBODIMENTS

Embodiments of the invention will be described below. These embodiments are offered by way of illustration only. The invention is not limited to these embodiments and includes various modified embodiments without departing from the gist of the invention. Furthermore, all the elements described below are not necessarily essential for the invention.

1. Pretreatment Liquid, Ink Set, and Recording Method

A pretreatment liquid for use in ink jet pigment textile printing according to an embodiment of the invention contains at least one of a resin dispersion and a cross-linker, a lubricant, and water. An ink set according to an embodiment of the invention contains a pretreatment liquid according to an embodiment of the invention and an ink composition containing a pigment. A recording method according to an embodiment of the invention includes applying a pretreatment liquid according to an embodiment of the invention to a textile and applying by an ink jet method an ink composition containing a pigment to a region of the textile to which the pretreatment liquid is applied.

A pretreatment liquid, an ink set, and a recording method according to the present embodiment will be described below with respect to the configuration of a recording apparatus, an ink composition, a pretreatment liquid, and a textile in this order, and subsequently processes of the recording method will be described.

1.1. Recording Apparatus

First, a recording apparatus with which the recording method according to the present embodiment is implemented will be described below with reference to the accompanying drawing. A recording apparatus for use in the recording method according to the present embodiment is not limited to the recording apparatus described below.

Although the recording apparatus in the present embodiment is an on-carriage type printer, which includes an ink cartridge on a carriage, the recording apparatus is not limited to the on-carriage type printer and may be an off-carriage type printer, which includes an ink cartridge outside a carriage.

A printer described below is a serial printer, which includes a print head on a carriage that moves in a specified direction, and droplets are ejected onto a recording medium while the head moves with the carriage. In the present embodiment, however, the recording apparatus is not limited to the serial printer and may be a line printer, which includes a head wider than a recording medium, and droplets are ejected onto a recording medium while the print head stops.

In the drawing, the sizes of components are appropriately altered for the sake of clarity.

For example, the recording apparatus is an ink jet printer with an ink jet head illustrated in the FIGURE (hereinafter also referred to as a "printer"). As illustrated in the FIGURE, a printer 1 includes a carriage 4, on which an ink jet head 2 is disposed and to which an ink cartridge 3 is detachably attached, a platen 5, which is disposed under the ink jet head 2 and over which a recording medium, a textile M, is transported, a heating mechanism 6 for heating the textile M, a carriage drive mechanism 7 for moving the carriage 4 in the medium width direction of the textile M, and a medium transport mechanism 8 for transporting the textile M in the medium transport direction. The printer 1 further includes a controller CONT for controlling the operation of the printer 1. The medium width direction is the main scanning direction (the head scanning direction). The medium transport direction is a sub-scanning direction (a direction perpendicular to the main scanning direction).

The ink jet head 2 is a means for depositing ink on the textile M and includes nozzles (not shown) for ejecting ink facing the textile M. These nozzles are arranged in line and form a nozzle surface on the nozzle plate surface.

Ink is ejected from the nozzles, for example, by applying a strong electric field between the nozzles and an accelerating electrode disposed in front of the nozzles, continuously ejecting ink droplets from the nozzles, and sending recording information signals to deflection electrodes while the ink droplets fly between the deflection electrodes (an electrostatic attraction method); by applying a pressure to a reaction liquid with a small pump and mechanically vibrating the nozzles with a crystal oscillator to forcibly eject ink droplets; by applying a pressure to ink with a piezoelectric device according to recording information signals to eject ink droplets for recording (a piezoelectric method); or by heating and foaming ink with a microelectrode according to recording information signals and ejecting ink droplets for recording (a thermal jet method).

The ink jet head 2 may be a line-type ink jet head or a serial-type ink jet head and is a serial-type ink jet head in the present embodiment.

In a recording apparatus with the serial-type ink jet head, scanning (pass) is performed multiple times to eject ink for recording while a recording ink jet head is moved relative to a recording medium. In a specific example of the serial-type ink jet head, the ink jet head is disposed on a carriage that moves in the width direction of a recording medium (in a direction across the recording medium transport direction), and droplets are ejected onto the recording medium while the ink jet head moves with the carriage.

In a recording apparatus with the line-type ink jet head, scanning (pass) is performed once to eject ink for recording while the ink jet head is moved relative to a recording medium. In a specific example of the line-type ink jet head, the ink jet head is wider than a recording medium, and droplets are ejected onto the recording medium while the ink jet head stops.

In the present embodiment, the ink cartridge 3, which supplies ink to the ink jet head 2, is composed of four independent cartridges. The four cartridges are charged with different types of ink, for example. The ink cartridge 3 is detachably attached to the ink jet head 2. Although four cartridges are illustrated in the FIGURE, a desired number of cartridges may be mounted.

The carriage 4 is supported by a guide rod 9, which is a supporting member disposed in the main scanning direction. The carriage drive mechanism 7 moves the carriage 4 along the guide rod 9 in the main scanning direction. Although the carriage 4 moves in the main scanning direction in the embodiment illustrated in the FIGURE, the carriage 4 may move in a sub-scanning direction as well as in the main scanning direction.

The heating mechanism 6 may be disposed at any position at which the textile M can be heated. In the embodiment illustrated in the FIGURE, the heating mechanism 6 is disposed on the platen 5 and faces the ink jet head 2. Thus, the heating mechanism 6 facing the ink jet head 2 can reliably heat the droplet deposition position on the textile M and can efficiently dry droplets on the textile M.

The heating mechanism 6 may be a print heater mechanism for heating the textile M in contact with a heat source, an infrared light or microwave (an electromagnetic wave with a maximum wavelength of approximately 2,450 MHz) irradiation mechanism, or a dryer mechanism for blowing warm air.

The textile M is heated by the heating mechanism 6 before or when droplets ejected from the nozzles of the ink jet head 2 are deposited on the textile M. The controller CONT controls the heating conditions (for example, the timing of heating, heating temperature, heating time, etc.).

The textile M is heated by the heating mechanism 6 at a temperature in the range of 35° C. to 65° C. in consideration of the wettability and spreadability, penetrability, drying characteristics, and ejection stability of ink. The heating temperature of the textile M refers to the surface temperature of the recording surface of the textile M during heating.

The printer 1 may include a second heating mechanism not shown in the FIGURE in addition to the heating mechanism 6. The second heating mechanism may be disposed downstream from the heating mechanism 6 in the textile M transport direction. The second heating mechanism heats the textile M after the textile M is heated by the heating mechanism 6, that is, after droplets ejected from the nozzles are deposited on the textile M. The second heating mechanism can improve the drying characteristics of ink droplets on the textile M. The second heating mechanism may be any of the mechanisms described above for the heating mechanism 6 (for example, a dryer mechanism, etc.).

A linear encoder 10 detects a signal to determine the position of the carriage 4 in the main scanning direction. The detected signal is sent as position information to the controller CONT. The controller CONT determines the scanning position of the ink jet head 2 based on the position information from the linear encoder 10 and controls the recording operation (ejecting operation) of the ink jet head 2. The controller CONT can control the moving speed of the carriage 4.

In the recording method according to the present embodiment, the following ink composition is used for recording with the recording apparatus.

1.2. Ink Composition

An ink composition for use in a recording method according to an embodiment of the invention contains a pigment. The ink composition in the present embodiment, together with a pretreatment liquid according to the present embodiment described later, constitutes an ink set.

Some components of the ink composition (hereinafter also referred to simply as an "ink") for use in the recording method according to the present embodiment will be described in detail below.

1.2.1. Pigment

The ink composition for use in the recording method according to the present embodiment contains a pigment as a coloring material. The pigment may be, but is not limited to, an inorganic pigment or an organic pigment. Examples of the pigment include organic pigments, such as azo, phthalocyanine, condensed polycyclic, nitro, nitroso, hollow resin particles, and polymer particles (Brilliant Carmine 6B, Lake Red C, Watching Red, disazo yellow, Hansa yellow, phthalocyanine blue, phthalocyanine green, alkali blue, and aniline black), metals, such as cobalt, iron, chromium, copper, zinc, lead, titanium, vanadium, manganese, and nickel, metal oxides and sulfides, such as titanium oxide, zinc oxide, antimony oxide, zinc sulfide, and zirconium oxide, carbon blacks, such as furnace carbon black, lampblack, acetylene black, and channel black (C.I. Pigment Black 7), and inorganic pigments, such as ocher, ultramarine blue, and Prussian blue.

Examples of carbon blacks used as black pigments include No. 2300, No. 900, MCF88, No. 33, No. 40, No. 45, No. 52, MA7, MA8, MA100, and No. 2200B (trade names, manufactured by Mitsubishi Chemical Corporation), Raven 5750, Raven 5250, Raven 5000, Raven 3500, Raven 1255, and Raven 700 (trade names, manufactured by Columbian Carbon Co.), Regal 400R, Regal 330R, Regal 660R, Mogul L, Monarch 700, Monarch 800, Monarch 880, Monarch 900, Monarch 1000, Monarch 1100, Monarch 1300, and Monarch 1400 (trade names, manufactured by Cabot Corporation), and Color Black FW1, Color Black FW2, Color Black FW2V, Color Black FW18, Color Black FW200, Color Black 5150, Color Black 5160, Color Black S170, Printex 35, Printex U, Printex V, Printex 140U, Special Black 6, Special Black 5, Special Black 4A, and Special Black 4 (trade names, manufactured by Degussa AG).

Examples of white pigments include C.I. Pigment White 1 (basic lead carbonate), 4 (zinc oxide), 5 (a mixture of zinc sulfide and barium sulfate), 6 (titanium oxide), 6:1 (titanium oxide containing another metal oxide), 7 (zinc sulfide), 18 (calcium carbonate), 19 (clay), 20 (mica titanium), 21 (barium sulfate), 22 (natural barium sulfate), (gloss white), 24 (alumina white), 25 (gypsum), 26 (magnesium oxide-silicon oxide), 27 (silica), and 28 (anhydrous calcium silicate).

Examples of yellow pigments include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of magenta pigments include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245, and C.I. Pigment Violet 19, 23, 32, 33, 36, 38, 43, and 50.

Examples of cyan pigments include C.I. Pigment Blue 1, 2, 3, 15, 15:1, 15:2, 15:3, 15:34, 15:4, 16, 18, 22, 25, 60, 65, and 66.

Examples of pigments other than black, white, yellow, magenta, and cyan include C.I. Pigment Green 7 and 10, C.I. Pigment Brown 3, 5, 25, and 26, and C.I. Pigment Orange 1, 2, 5, 7, 13, 14, 15, 16, 24, 34, 36, 38, 40, 43, and 63.

These exemplified pigments may be used in combination. The total pigment (solid) content of the ink composition depends on the type of pigment and preferably ranges from 1% to 30% by mass, more preferably 2% to 15% by mass, of the total mass (100% by mass) of the ink composition in terms of high color developability.

In preparation of the ink composition, a pigment may be dispersed in advance to prepare a pigment dispersion liquid, and the pigment dispersion liquid may be added to the ink composition. Such a pigment dispersion liquid may be prepared by dispersing a self-dispersing pigment in a dispersion medium without using a dispersant, by dispersing a pigment in a dispersion medium using a polymer dispersant, or by dispersing a surface-treated pigment in a dispersion medium.

Polymer Dispersant

Among these, examples of the polymer dispersant include, but are not limited to, poly(vinyl alcohol), polyvinylpyrrolidone, poly(acrylic acid), acrylic acid-acrylonitrile copolymers, vinyl acetate-acrylate copolymers, acrylic acid-acrylate copolymers, styrene-acrylic acid copolymers, styrene-methacrylic acid copolymers, styrene-methacrylic acid-acrylate copolymers, styrene-α-methylstyrene-acrylic acid copolymers, styrene-α-methylstyrene-acrylic acid-acrylate copolymers, styrene-maleic acid copolymers, styrene-maleic anhydride copolymers, vinylnaphthalene-acrylic acid copolymers, vinylnaphthalene-maleic acid copolymers, vinyl acetate-maleate copolymers, vinyl acetate-crotonic acid copolymers, vinyl acetate-acrylic acid copolymers, and salts thereof. Among these, copolymers composed of a monomer having a hydrophobic functional group and a monomer having a hydrophilic functional group and polymers composed of a monomer having both a hydrophobic functional group and a hydrophilic functional group are preferred. The copolymers may be random copolymers, block copolymers, alternating copolymers, or graft copolymers.

The polymer dispersant may be a commercial product. Specific examples include Joncryl 67 (weight-average molecular weight: 12,500, acid value: 213), Joncryl 678 (weight-average molecular weight: 8,500, acid value: 215), Joncryl 586 (weight-average molecular weight: 4,600, acid value: 108), Joncryl 611 (weight-average molecular weight: 8,100, acid value: 53), Joncryl 680 (weight-average molecular weight: 4,900, acid value: 215), Joncryl 682 (weight-average molecular weight: 1,700, acid value: 238), Joncryl 683 (weight-average molecular weight: 8,000, acid value: 160), and Joncryl 690 (weight-average molecular weight: 16,500, acid value: 240) (trade names, manufactured by BASF Japan Ltd.).

1.2.2. Resin Dispersion

The ink composition in the present embodiment preferably contains a resin dispersion. The resin dispersion can improve the fixability of an image formed of the ink composition and improve image fastness.

Examples of the resin of the resin dispersion include acrylic resins, styrene-acrylic resins, fluorene resins, urethane resins, polyolefin resins, rosin-modified resins, terpene resins, polyester resins, polyamide resins, epoxy resins, vinyl chloride resins, vinyl chloride-vinyl acetate copolymers, and ethylene-vinyl acetate resins. These resins may be used alone or in combination. Among these, due to high design flexibility and consequent high achievability of desired physical properties, at least one selected from urethane resins and acrylic resins is preferably used, and urethane resins are more preferably used.

Examples of the urethane resins include any urethane resins having a urethane skeleton and having water dispersibility, for example, commercial products such as Superflex 460, 460s, and 840 (trade names, manufactured by Dai-ichi Kogyo Seiyaku Co., Ltd.), Resamine D-1060, D-2020, D-4080, D-4200, D-6300, and D-6455 (trade names, manufactured by Dainichiseika Color & Chemicals Mfg. Co., Ltd.), Takelac WS-5000, WS-6021, and W-512-A-6 (trade names, manufactured by Mitsui Chemicals Polyurethane Co., Ltd.), and Sancure 2710 (trade name, manufactured by Lubrizol Corporation).

The urethane resins are preferably anionic urethane resins having an anionic functional group, such as a carboxy group, a sulfo group, or a hydroxy group, in terms of ink storage stability and in order to improve reactivity with a polyvalent metallic compound, if present, in a pretreatment liquid described later. Among the commercial products described above, the anionic urethane resins include Superflex 460, 460s, and 840 manufactured by Dai-ichi Kogyo Seiyaku Co., Ltd. and Takelac WS-5000, WS-6021, and W-512-A-6 manufactured by Mitsui Chemicals Polyurethane Co., Ltd.

The urethane resins may be polyether urethane resins having a urethane bond and an ether bond in the main chain, polyester urethane resins having a urethane bond and an ester bond in the main chain, and polycarbonate urethane resins having a urethane bond and a carbonate bond in the main chain. These urethane resins may be used in combination.

The acrylic resins may be polymers of an acrylic monomer, such as acrylic acid or acrylate, and copolymers of an acrylic monomer and another monomer, which may be a vinyl monomer, such as styrene. The acrylic resins may be commercial products, for example, Mowinyl 702, 7502, 7525, and 7320 (manufactured by The Nippon Synthetic Chemical Industry Co., Ltd.).

Such a resin dispersion may be in an emulsion state or in a solution state and is preferably in an emulsion state in order to reduce an increase in the viscosity of ink.

In the present embodiment, the resin dispersion for use in the ink composition may be a self-emulsifiable resin dispersion into which a hydrophilic component necessary to be stably dispersed in water is introduced or may be a water-dispersible resin dispersion containing an external emulsifier. In the presence of a process of depositing on a textile a treatment liquid containing an aggregating agent that aggregates a component of the ink composition, the resin dispersion for use in the ink composition is preferably a self-emulsifiable dispersion containing no emulsifier (a self-emulsifiable emulsion) due to a lower likelihood of inhibiting a reaction with a polyvalent metal salt in the pretreatment liquid.

In the present embodiment, in order to improve the fixability of the ink composition and maintain the softness (feel and texture) of a printed textile, the ink composition preferably contains a resin dispersion with a glass transition point (Tg) of 0° C. or less, more preferably −10° C. or less, still more preferably −20° C. or less. The glass transition point (Tg) is preferably −90° C. or more, more preferably −80° C. or more.

In the present embodiment, the glass transition point (Tg) can be determined by a known analytical method, such as viscoelastic measurement or thermal analysis, or by calculation using an equation from the Tg of a homopolymer of a polymerizable monomer already known. In the present specification, the glass transition point (Tg) is measured with a differential scanning calorimeter (DSC).

The resin dispersion solid content preferably ranges from 1% to 20% by mass of the total mass (100% by mass) of the ink composition, the lower limit being preferably 2.5% or more by mass, still more preferably 3% or more by mass. The upper limit of the resin dispersion content is preferably 15% or less by mass, more preferably 12% or less by mass. A resin dispersion content in this range can satisfy both ejection stability and the fastness of a printed textile.

1.2.3. Water

The ink composition in the present embodiment is preferably an aqueous ink composition containing water as a main solvent. Water is a main medium of the ink composition and is evaporated by drying. Examples of the water include pure waters, such as ion-exchanged water, ultrafiltered water, reverse osmosis water, and distilled water, and waters from which ionic impurities are removed as much as possible, such as ultrapure water. The use of water sterilized by ultraviolet irradiation or by the addition of hydrogen peroxide can prevent the growth of molds and bacteria during long-term storage of the ink composition.

The water content of the ink composition may be, but is not limited to, 50% or more by mass, 60% or more by mass, or 70% or more by mass, of the total mass (100% by mass) of the ink composition. The water content of the ink may be 95% or less by mass, 90% or less by mass, or 85% or less by mass. The term "water" in the ink composition includes a resin particle dispersion liquid used as a raw material and water added, for example. A water content of 50% or more by mass results in the ink composition with a relatively low viscosity.

1.2.4. Organic Solvent

In the present embodiment, the ink composition may contain an organic solvent as a solvent. An organic solvent improves the ejection stability of the ink composition in an ink jet method, improves the adhesion of the ink to a textile, and retards the drying of a head of an ink jet recording apparatus.

The organic solvent is preferably a water-soluble organic solvent, for example, a polyol compound, a glycol ether, a betaine compound, or a pyrrolidone derivative.

The polyol compound may be a polyol compound (preferably a diol compound) having 2 to 6 carbon atoms in the molecule and optionally having one ether bond in the molecule. Specific examples include glycols, such as 1,2-pentanediol, methyl triglycol (triethylene glycol monomethyl ether), butyl triglycol (triethylene glycol monobutyl ether), butyl diglycol (diethylene glycol monobutyl ether), dipropylene glycol monopropyl ether, glycerin, 1,2-hexanediol, 1,2-heptanediol, 1,3-propanediol, 1,2-butanediol, 1,3-butanediol, 1,4-butanediol, 2,3-butanediol, 2-methyl-3-phenoxy-1,2-propanediol, 3-(3-methylphenoxy)-1,2-propanediol, 3-hexyloxy-1,2-propanediol, 2-hydroxymethyl-2-phenoxymethyl-1,3-propanediol, 3-methyl-1,3-butanediol, 1,3-propanediol, 1,2-butanediol, 1,2-pentanediol, 1,4-butanediol, 1,5-pentanediol, 1,6-hexanediol, 2-methyl-2,4-pentanediol, and 3-methyl-1,5-pentanediol.

For example, the glycol ether is preferably a glycol monoalkyl ether selected from ethylene glycol, diethylene glycol, triethylene glycol, poly(ethylene glycol), propylene glycol, dipropylene glycol, tripropylene glycol, poly(propylene glycol), and polyoxyethylene polyoxypropylene glycol, more preferably triethylene glycol monomethyl ether, triethylene glycol monobutyl ether, or dipropylene glycol monopropyl ether.

The betaine compound is a compound (intramolecular salt) with a positive charge and a negative charge at nonadjacent positions in the molecule and with no electric charge as the whole molecule, the atom(s) with the positive charge not being bonded to a dissociable hydrogen atom. The betaine compound is preferably an N-alkyl substitution product of an amino acid, more preferably an N-trialkyl substitution product of an amino acid. Examples of the betaine compound include trimethylglycine (also referred to as "glycine betaine"), γ-butyrobetaine, homarine, trigonelline, carnitine, homoserine betaine, valine betaine, lysine betaine, ornithine betaine, alanine betaine, stachydrine, and glutamate betaine. Trimethylglycine is preferred.

The water-soluble organic solvent may be a pyrrolidone derivative. The pyrrolidone derivative may be N-methyl-2-pyrrolidone, N-ethyl-2-pyrrolidone, N-vinyl-2-pyrrolidone, 2-pyrrolidone, N-butyl-2-pyrrolidone, or 5-methyl-2-pyrrolidone.

These water-soluble organic solvents may be used in combination. The total water-soluble organic solvent content ranges from 0.2% to 30% by mass, preferably 0.4% to 20% by mass, more preferably 0.5% to 15% by mass, still more preferably 0.7% to 10% by mass, of the total amount of the ink composition in terms of the desired viscosity and surface tension of ink described later.

1.2.5. Surfactant

In the present embodiment, the ink composition may contain a surfactant. The surfactant may be a nonionic surfactant, an anionic surfactant, a cationic surfactant, an amphoteric surfactant, or a combination thereof. The surfactant can decrease the interfacial tension of the ink composition and thereby facilitate the penetration of the ink composition into a textile. Cationic surfactants may aggregate a component of the ink composition and are therefore preferably used in a minute amount, or another type of surfactant is preferably used.

The nonionic surfactant is preferably at least one of acetylenic glycol surfactants, acetylenic alcohol surfactants, fluorinated surfactants, and polysiloxane surfactants. The ink composition containing such a surfactant has improved wettability to a textile and improved pigment dispersion stability. An acetylenic glycol surfactant can relatively reduce penetration into a textile and is preferably used to further improve the color developability of an image.

Examples of the acetylenic glycol surfactants and acetylenic alcohol surfactants include, but are not limited to, 2,4,7,9-tetramethyl-5-decyne-4,7-diol, alkylene oxide adducts of 2,4,7,9-tetramethyl-5-decyne-4,7-diol, 2,4-dimethyl-5-decyn-4-ol, and alkylene oxide adducts of 2,4-dimethyl-5-decyn-4-ol, 3,6-dimethyl-4-octyne-3,6-diol, 3,5-dimethyl-1-hexyn-3-ol, and 2,4-dimethyl-5-hexyn-3-ol. The acetylenic glycol surfactants and acetylenic alcohol surfactants may be commercial products, for example, Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, and GA (trade names, manufactured by Air Products Japan, Inc.), Olfin B, Y, P, A, STG, SPC, E1004, E1010, PD-001, PD-002W, PD-003, PD-004, EXP. 4001, EXP. 4036, EXP. 4051, AF-103, AF-104, AK-02, SK-14, and AE-3 (trade names, manufactured by Nissin Chemical Industry Co., Ltd.), and Acetylenol E00, E00P, E40, and E100 (trade names, manufactured by Kawaken Fine Chemicals Co., Ltd.).

The fluorinated surfactants may be commercial products, for example, Megaface F-479 (trade name, manufactured by DIC Corporation) and BYK-340 (trade name, manufactured by BYK Japan KK).

The polysiloxane surfactants may be commercial products, for example, Olfin PD-501, Olfin PD-502, and Olfin PD-570 (trade names, manufactured by Nissin Chemical Industry Co., Ltd.), and BYK-347, BYK-348, and BYK-302 (trade names, manufactured by BYK Japan KK).

The nonionic surfactant may be a polyoxyethylene alkyl ether, a polyoxyethylene alkylphenyl ether, an alkyl glucoside, a polyoxyalkyleneglycol alkyl ether, a polyoxyalkylene glycol, a polyoxyalkyleneglycol alkylphenyl ether, a sucrose fatty acid ester, a polyoxyethylene fatty acid ester, a polyoxyethylene sorbitan fatty acid ester, a sorbitan fatty acid ester, a polyoxyalkylene acetylenic glycol, a polyoxyalkyleneglycol alkylamine, a polyoxyethylene alkylamine, a polyoxyethylene alkylamine oxide, a fatty acid alkanolamide, an alkylolamide, or a polyoxyethylene polyoxypropylene block polymer.

The anionic surfactant may be a higher fatty acid salt, a soap, an α-sulfo fatty acid methyl ester salt, a linear alkylbenzene sulfonate, an alkyl sulfate ester salt, an alkyl ether sulfate ester salt, a monoalkyl phosphate ester salt, an α-olefin sulfonate, an alkylbenzene sulfonate, an alkylnaphthalene sulfonate, a naphthalene sulfonate, an alkane sulfonate, a polyoxyethylene alkyl ether sulfate, a sulfosuccinate, or a polyoxyalkyleneglycol alkyl ether phosphate salt.

The amphoteric surfactant may be an amino acid, such as an alkylamino fatty acid salt, a betaine, such as an alkylcarboxyl betaine, or an amine oxide, such as an alkylamine oxide. The amphoteric surfactant is not limited to these.

The exemplified surfactants may be used in combination.

The lower limit of the surfactant content is preferably 0.1% or more by mass, more preferably 0.3% or more by mass, still more preferably 0.5% or more by mass, of the total mass (100% by mass) of the ink. The upper limit of the surfactant content is preferably 10% or less by mass, more preferably 7% or less by mass, still more preferably 5% or less by mass, particularly preferably 2% or less by mass, still more preferably 1% or less by mass, of the total mass (100% by mass) of the ink.

1.2.6. Other Components

In the present embodiment, the ink composition may contain a pH-adjusting agent, a preservative and fungicide, an anticorrosive, and/or a chelating agent, as required.

pH-Adjusting Agent

The pH-adjusting agent may be potassium dihydrogen phosphate, disodium hydrogen phosphate, sodium hydroxide, lithium hydroxide, potassium hydroxide, ammonia, diethanolamine, triethanolamine, triisopropanolamine, potassium carbonate, sodium carbonate, or sodium hydrogen carbonate.

Preservative and Fungicide

The preservative and fungicide may be sodium benzoate, pentachlorophenol sodium, 2-pyridinethiol-1-oxide sodium, sodium sorbate, sodium dehydroacetate, or 1,2-benzisothiazol-3-one (Proxel CRL, Proxel BND, Proxel GXL, Proxel XL-2, or Proxel TN manufactured by ICI).

Chelating Agent

Chelating agents can trap ions. Examples of the chelating agents include ethylenediamine tetraacetic acid salt (EDTA), ethylenediamine nitrilotriacetate, hexametaphosphate, pyrophosphate, and metaphosphate.

1.2.7. Method for Preparing Ink Composition

The ink composition in the present embodiment is produced by mixing the components in any order and, if necessary, filtering the mixture to remove impurities. The components are preferably sequentially charged and mixed in a container equipped with an agitator, such as a mechanical stirrer or a magnetic stirrer. If necessary, filtration may be performed by centrifugal filtration or filter filtration.

1.2.8. Physical Properties of Ink Composition

The ink composition in the present embodiment has a surface tension of 28 mN/m or less, preferably 27.5 mN/m or less, more preferably 27.2 mN/m or less, at 40° C. Having a surface tension in this range, the ink composition has high ejection stability, uniform wettability and spreadability to a textile during deposition on the textile, and high penetrability into the textile, in ink jet textile printing. This facilitates fixing of the ink composition on the textile and improves the fastness of the printed textile. The lower limit of the surface tension of the ink composition at 40° C. is preferably 25 mN/m or more, more preferably 26 mN/m or more, still more preferably 26.5 mN/m or more.

The ink composition in the present embodiment preferably has a surface tension in the range of 20 to 40 mN/m, more preferably 25 to 35 mN/m, at 20° C., in terms of uniform wettability and spreadability to a textile during deposition on the textile and penetrability into the textile.

The surface tension can be measured, for example, by wetting a platinum plate with ink in an automatic surface tensiometer CBVP-Z (trade name, manufactured by Kyowa Interface Science Co., Ltd.) at 40° C. or 20° C.

The ink composition has a viscosity of 4.5 mPa·s or less, preferably 4.0 mPa·s or less, more preferably 3.5 mPa·s or less, at 40° C. Having a viscosity in this range at 40° C., the ink composition has high ejection stability, uniform wettability and spreadability to a textile during deposition on the textile, and high penetrability into the textile, in ink jet textile printing. This facilitates fixing of the ink composition on the textile and improves the fastness of the printed textile. The lower limit of the viscosity of the ink composition at 40° C. is preferably 2.5 mPa·s or more, more preferably 2.8 mPa·s or more, still more preferably 3.0 mPa·s or more.

The ink composition preferably has a viscosity in the range of 2 to 7.0 mPa·s, more preferably 3.0 to 6.0 mPa·s, still more preferably 4 to 5.5 mPa·s, most preferably 4.5 to 5.0 mPa·s, at 20° C. The ink composition having a viscosity in this range at 20° C. can be easily fixed to a textile, and the resulting printed textile has improved leveling and fastness.

The viscosity can be measured, for example, with a viscoelastometer MCR-300 (trade name, manufactured by Physica) at 40° C. or 20° C.

1.3. Pretreatment Liquid

In the recording method according to the present embodiment, before the ink composition for ink jet textile printing is deposited on a textile, the textile is treated with a pretreatment liquid. The pretreatment liquid for use in ink jet pigment textile printing according to the present embodiment contains at least one of a resin dispersion and a cross-linker, a lubricant, and water. Some components of the pretreatment liquid according to the present embodiment will be described in detail below.

1.3.1. Resin Dispersion

The pretreatment liquid according to the present embodiment may contain a resin dispersion (water-dispersible resin, resin emulsion) in order to improve the wet friction fastness and dry friction fastness of a printed textile. The wet friction fastness of a printed textile tends to increase with the adhesion between ink and a textile substrate (scaffold reinforcement). A resin in the resin dispersion of the pretreatment liquid is fused with textile fibers and reinforces the scaffold on the fibers, thereby improving the wet friction fastness of ink on the scaffold.

Examples of the resin dispersion include, but are not limited to, dispersions of homopolymers and copolymers of (meth)acrylic acid, (meth)acrylate, acrylonitrile, cyanoacrylate, acrylamide, olefin, styrene, vinyl acetate, vinyl chloride, vinyl alcohol, vinyl ether, vinylpyrrolidone, vinylpyridine, vinylcarbazole, vinylimidazole, and vinylidene chloride, fluoropolymers, and natural resins. Urethane resin dispersions may also be used. Among these, resin dispersions containing at least one of (meth)acrylic resins, urethane resins, and styrene-(meth)acrylic acid copolymer resins are preferred. At least one of acrylic resins, urethane resins, and styrene-acrylic acid copolymer resins are more preferred. Styrene-acrylic acid copolymer resins and urethane resins are still more preferred. The copolymers may be random copolymers, block copolymers, alternating copolymers, or graft copolymers. In particular, polyurethane resin dispersions (hereinafter also referred to as urethane resin emulsions) are preferred.

The urethane resin emulsions may be those having a urethane bond in the molecule and may be polyether urethane resin emulsions having a urethane bond and an ether bond in the main chain, polyester urethane resin emulsions having a urethane bond and an ester bond in the main chain, or polycarbonate urethane resin emulsions having a urethane bond and a carbonate bond in the main chain.

The resin particles in the resin dispersion preferably have D50 in the range of 30 to 300 nm, more preferably 40 to 100 nm. D50 is a volume average. And D50 is measured by a laser diffraction scattering method. D50 in this range results in uniformly dispersed resin particles in the resin dispersion in the pretreatment liquid. This also results in higher scratch resistance of a printed textile.

Examples of commercial products of the resin dispersion include Microgel E-1002 and E-5002 (trade names, manufactured by Nippon Paint Co., Ltd., styrene-acrylic resin emulsions), Voncoat 4001 (trade name, manufactured by DIC Corporation, acrylic resin emulsion), Voncoat 5454 (trade name, manufactured by DIC Corporation, styrene-acrylic resin emulsion), Polysol AM-710, AM-920, AM-2300, AP-4735, AT-860, and PSASE-4210E (acrylic resin emulsions), Polysol AP-7020 (styrene-acrylic resin emulsion), Polysol SH-502 (poly(vinyl acetate) resin emulsion), Polysol AD-13, AD-2, AD-10, AD-96, AD-17, and AD-70 (ethylene-poly(vinyl acetate) resin emulsion), and Polysol PSASE-6010 (ethylene-poly(vinyl acetate) resin emulsion, trade names, manufactured by Showa Denko K.K.), Polysol SAE1014 (trade name, styrene-acrylic resin emulsion, manufactured by Zeon Corporation), Saibinol SK-200 (trade name, acrylic resin emulsion, manufactured by Saiden Chemical Industry Co., Ltd.), AE-120A (trade name, manufactured by JSR Corporation, acrylic resin emulsion), AE373D (trade name, manufactured by Emulsion Technology Co., Ltd., carboxy-modified styrene-acrylic resin emulsion), Seikadyne 1900W (trade name, manufactured by Dainichiseika Color & Chemicals Mfg. Co., Ltd., ethylene-poly(vinyl acetate) resin emulsion), Vinyblan 2682 (acrylic resin emulsion), Vinyblan 2886 (vinyl acetate-acrylic resin emulsion), and Vinyblan 5202 (acetic acid acrylic resin emulsion, trade names, manufactured by Nissin Chemical Industry Co., Ltd.), Elitel KA-5071S, KT-8803, KT-9204, KT-8701, KT-8904, and KT-0507 (trade names, manufactured by Unitika Ltd., polyester resin emulsions), Hytec SN-2002 (trade name, manufactured by Toho Chemical Industry Co., Ltd., polyester resin emulsion), Takelac W-6020, W-635, W-6061, W-605, W-635, W-6021, WR-620, and WR-640 (trade names, manufactured by Mitsui Chemicals Polyurethane Co., Ltd., urethane resin emulsion), Ucoat UA-368 (trade name, manufactured by Sanyo Chemical Industries, Ltd., polycarbonate resin emulsion), UX-2510, Permarin UC-20 and UA-99 (trade names, manufactured by Sanyo Chemical Industries, Ltd., polyether resin emulsions), Permarin UA-150 (trade name, manufactured by Sanyo Chemical Industries, Ltd., urethane resin emulsion), Superflex 500M, 870, 800, 150, 420, 460, 470, 610, and 700 (trade names, manufactured by Dai-ichi Kogyo Seiyaku Co., Ltd., urethane resin emulsions), Sancure 2710 (trade name, manufactured by Lubrizol Japan Limited, urethane resin emulsion), NeoRez R-9660, R-9637, and R-940 (trade names, manufactured by Kusumoto Chemicals, Ltd., urethane resin emulsions), Adeka Bontighter HUX-380 and 290K (trade names, manufactured by ADEKA, urethane resin emulsions), Mowinyl 710A, 718A, 730L, 731A, 742A, 952B, 7320, 7400, 7420, DM772, LDM7222, and LDM7582 (acrylic resin emulsions), Mowinyl 966A, 975N, and 6960 (styrene-acrylic resin emulsions), Mowinyl 50M, 51, 350, 352, 384, D, and HA10A (poly(vinyl acetate) resin emulsions), Mowinyl 760H and 761HG (vinyl acetate-acrylic resin emulsions), and Mowinyl 358 and FK-5 (vinyl acetate copolymer resin emulsions, trade names, manufactured by The Nippon Synthetic Chemical Industry Co., Ltd.), Joncryl 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (trade names, manufactured by BASF), NK Binder R-5HN (trade name, manufactured by Shin Nakamura Chemical Co., Ltd.), and Hydran WLS-201, WLS-202, WLS-210, WLS-213, WLS-221, WLI-602, and WLI-611 (trade names, manufactured by DIC Corporation, non-cross-linking polyurethane).

In the present embodiment, the resin dispersion is preferably any one selected from the group consisting of nonionic dispersions, cationic dispersions, and emulsifier-dispersible anionic dispersions. Such a resin dispersion is less reactive to the other components of the pretreatment liquid and thereby improves the stability of the pretreatment liquid. Thus, a printed textile that has wet friction fastness and dry friction fastness and retains the feel and texture of the textile can be produced in ink jet pigment textile printing.

In the present embodiment, the resin dispersion content of the pretreatment liquid is not particularly limited, and the upper limit of the resin dispersion solid content is preferably 20% or less by mass, more preferably 10% or less by mass, still more preferably 5% or less by mass, of the total mass (100% by mass) of the pretreatment liquid. A resin dispersion solid content of 20% or less by mass based on the total mass of the pretreatment liquid results in improved wet friction fastness and dry friction fastness of a printed textile as well as improved feel and texture of the printed textile. The lower limit of the resin dispersion solid content is preferably 1% or more by mass, more preferably 1.5% or more by mass, still more preferably 2% or more by mass, of the total mass (100% by mass) of the pretreatment liquid. The solid content refers to the amount of solids and excludes the substances other than the resin (solid) contained in the resin dispersion.

1.3.2. Cross-Linker

The pretreatment liquid according to the present embodiment may contain a cross-linker. In the present embodiment, a cross-linking group of the cross-linker in the pretreatment liquid reacts with a hydroxy group of cellulose of a cotton textile, thereby reinforcing the scaffold, improving the adhesiveness of the pigment, and enhancing the wet friction fastness of ink. The cross-linker also reacts with a resin dispersion in the ink composition or a resin dispersion, if present, in the pretreatment liquid and covers the pigment (encapsulation), thereby improving the adhesiveness of the pigment.

In the present embodiment, the cross-linker may be a compound having a plurality of glycidyl ether moieties, a compound having a plurality of oxazoline groups, or a compound having a plurality of terminal blocked isocyanate groups. The compound having glycidyl ether moieties may be an epoxy resin having a glycidyl ether skeleton. The compound having oxazoline groups may be a resin having oxazoline groups. The compound having terminal blocked isocyanate groups may be a urethane resin having terminal blocked isocyanate groups. Examples of commercial products of these compounds include Elastron BN-69, BN-77, BN-27, BN-11, BN-P17, and BN-P18 (trade names, manufactured by Dai-ichi Kogyo Seiyaku Co., Ltd., aqueous urethane resins).

In the present embodiment, the cross-linker is preferably any one selected from the group consisting of nonionic dispersions, cationic dispersions, and emulsifier-dispersible anionic dispersions. Such a cross-linker is less reactive to the other components of the pretreatment liquid and thereby improves the stability of the pretreatment liquid. Thus, a printed textile that has wet friction fastness and dry friction fastness and retains the feel and texture of the textile can be produced in ink jet pigment textile printing.

In the present embodiment, the cross-linker content of the pretreatment liquid is not particularly limited, and the upper limit of the cross-linker solid content is preferably 10% or less by mass, more preferably 5% or less by mass, still more preferably 3% or less by mass, of the total mass (100% by mass) of the pretreatment liquid. A cross-linker solid content of 10% or less by mass based on the total mass of the pretreatment liquid results in improved wet friction fastness and dry friction fastness of a printed textile as well as improved feel and texture of the printed textile. The lower limit of the cross-linker solid content is preferably 0.1% or more by mass, more preferably 0.5% or more by mass, still more preferably 1% or more by mass, of the total mass (100% by mass) of the pretreatment liquid. The solid content refers to the amount of solids.

The pretreatment liquid according to the present embodiment contains at least one of the cross-linker and the resin dispersion, and a urethane resin having terminal blocked isocyanate groups corresponds to the cross-linker.

1.3.3. Lubricant

In the present embodiment, the pretreatment liquid contains a lubricant. In the present embodiment, the pretreatment liquid containing at least one of the resin dispersion and the cross-linker and the lubricant can improve the wet friction fastness and dry friction fastness of recorded matter and can maintain the feel and texture of a textile.

In the present embodiment, examples of the lubricant include waxes, for example, plant and animal waxes, such as carnauba wax, candelilla wax, beeswax, rice wax, and lanolin; mineral waxes, such as montan wax and ozokerite; petroleum waxes, such as paraffin wax; synthetic waxes, such as carbon wax, Hoechst wax, polyolefin wax, silicone wax, and stearamide; natural and synthetic wax emulsions, such as α-olefin-maleic anhydride copolymers; and compound waxes. These waxes impart slipperiness to the surface of recorded matter and improve the scratch resistance of the surface, thereby improving the wet friction fastness and dry friction fastness of the recorded matter. These waxes may be used alone or in combination. Among these, silicone wax, polyolefin wax, and paraffin wax are preferred.

Examples of commercial products of silicone wax include SM8706EX, SM7036EX, SM7060EX, SM7025EX, SM490EX, SM8701EX, SM8709SR, SM8716SR, IE-7045, IE-7046T, SH7024, BY22-744EX, BY22-818EX, FZ-4658, FZ-4634EX, and FZ-4602 (trade names, manufactured by Dow Corning Toray Co., Ltd.), and POLON-MF-14, POLON-MF-14EC, POLON-MF-23POLON-MF-63, POLON-MF-18T, POLON-MF-56, POLON-MF-49, POLON-MF-33A, POLON-MF-55T, POLON-MF-28T, POLON-MF-50, POLON-MK-206, POLON-SR-CONC, KM-9771, KM-9774, KM-2002-T, KM-2002-L-1, KM-9772, KS-7002, KS-701, and X-51-1264 (trade names, manufactured by Shin-Etsu Chemical Co., Ltd.).

Silicone wax preferably forms fine particles in the pretreatment liquid (that is, in an emulsion state or in a suspension state). This allows the pretreatment liquid to have a viscosity suitable for ejection from an ink jet head and ensures the storage stability and ejection stability of the pretreatment liquid.

Examples of polyolefin wax include, but are not limited to, olefins, such as ethylene, propylene, and butylene, waxes produced from their derivatives, and copolymers thereof; more specifically, polyethylene wax, polypropylene wax, and polybutylene wax. Among these, polyethylene wax is preferred due to a decreased number of cracks in images and high wet friction fastness and dry friction fastness. Polyolefin waxes may be used alone or in combination.

Examples of commercial products of polyolefin wax include Chemipearl series, such as "Chemipearl W4005" (manufactured by Mitsui Chemicals, Inc., polyethylene wax, particle size: 200 to 800 nm, ring-and-ball softening point: 110° C., penetration hardness: 3, solid content: 40%). Other examples include AQUACER series, such as AQUACER 513 (polyethylene wax, particle size: 100 to 200 nm, melting point: 130° C., solid content: 30%), AQUACER 507, AQUACER 515, AQUACER 840, and AQUACER 1547 (trade names, manufactured by BYK Japan KK), Hytec series, such as Hytec E-7025P, Hytec E-2213, Hytec E-9460, Hytec E-9015, Hytec E-4A, Hytec E-5403P, and Hytec E-8237 (trade names, manufactured by Toho Chemical Industry Co., Ltd.), and Nopcote PEM-17 (trade name, manufactured by San Nopco Ltd., polyethylene emulsion, particle size: 40 nm).

Polyolefin wax preferably forms fine particles in the pretreatment liquid (that is, in an emulsion state or in a suspension state). This allows the pretreatment liquid to have a viscosity suitable for ejection from an ink jet head and ensures the storage stability and ejection stability of the pretreatment liquid.

The polyolefin wax preferably has an average particle size in the range of 10 to 800 nm, more preferably 40 to 600 nm, particularly preferably 150 to 300 nm. The average particle size is a volume average particle size. A polyolefin wax with an average particle size in this range can decrease the number of cracks in images and improve scratch resistance of the images. Such a polyolefin wax also improves the ink jet head ejection stability and the wet friction fastness and dry friction fastness of images thus formed.

The average particle size of the wax can be measured with a particle size distribution analyzer designed on the principle of laser diffraction scattering. The particle size distribution analyzer may be a particle size distribution analyzer designed on the principle of dynamic light scattering (for example, "Microtrac UPA" manufactured by Nikkiso Co., Ltd.).

Paraffin wax is also referred to as petroleum wax. The term "paraffin", as used herein, refers to alkanes (open-chain saturated hydrocarbons represented by the general formula $C_nH_{2n+2}$) having 20 or more carbon atoms. Paraffin wax in the present embodiment refers to a mixture of hydrocarbons with a molecular weight in the range of approximately 300 to 500 that contains linear paraffinic hydrocarbons (normal paraffin) having 20 to 30 carbon atoms as main components and a small amount of iso-paraffin. The pretreatment liquid containing paraffin wax imparts slipperiness to recorded matter and improves the scratch resistance of the recorded matter. Due to its water repellency, a proper amount of paraffin wax improves the water resistance of recorded matter. These functions improve the wet friction fastness and dry friction fastness of recorded matter thus formed.

In the present embodiment, paraffin wax also preferably forms fine particles in the pretreatment liquid (that is, in an emulsion state or in a suspension state). Fine particles of paraffin wax allow the pretreatment liquid to have a viscosity suitable for ejection from an ink jet head and ensure the storage stability and ejection stability of the pretreatment liquid.

Fine particles of paraffin wax preferably have an average particle size in the range of 5 to 400 nm, more preferably 50 to 200 nm, in order to ensure the storage stability and ejection stability of the pretreatment liquid. The average particle size is a volume average particle size. The volume average particle size is measured by a laser diffraction scattering method.

Examples of commercial products of paraffin wax include AQUACER 537 and AQUACER 539 (trade names, manufactured by BYK Japan KK).

The lubricant solid content preferably ranges from 0.1% to 10% by mass, more preferably 0.5% to 5.0% by mass, still more preferably 1.0% to 4.0% by mass, of the total mass (100% by mass) of the pretreatment liquid. A lubricant content in this range results in a printed textile that has wet friction fastness and dry friction fastness and that retains the feel and texture of the textile.

In the present embodiment, the lubricant is preferably any one selected from the group consisting of nonionic dispersions, cationic dispersions, and emulsifier-dispersible anionic dispersions. Such a lubricant is less reactive to the other components of the pretreatment liquid and thereby improves the stability of the pretreatment liquid. Thus, a printed textile that has wet friction fastness and dry friction fastness and retains the feel and texture of the textile can be produced in ink jet pigment textile printing.

1.3.4. Water

The pretreatment liquid according to the present embodiment contains water as a main solvent. The water is evaporated by drying after the pretreatment liquid is deposited on a textile recording medium. The water described above in Ink Composition can be used here and will not be further described. The water content of the pretreatment liquid is 50% or more by mass, preferably 60% or more by mass, more preferably 70% or more by mass, of the total mass (100% by mass) of the pretreatment liquid. The term "water" in the pretreatment liquid includes a resin particle dispersion liquid used as a raw material and water added, for example. In the present embodiment, the pretreatment liquid with a water content of 50% or more by mass can have a relatively low viscosity and can be applied by an ink jet method. The upper limit of the water content is preferably 90% or less by mass, more preferably 85% or less by mass, still more preferably 80% or less by mass, of the total mass (100% by mass) of the pretreatment liquid.

1.3.5. Cationic Compound

In the present embodiment, the pretreatment liquid preferably contains a cationic compound. The cationic compound acts as an aggregating agent and aggregates by a reaction with a component of the ink composition in ink jet pigment textile printing. This improves the color developability of a printed textile.

Examples of the cationic compound include polyvalent metal salts, cationic polymers, and cationic surfactants. These cationic compounds may be used alone or in combination.

The polyvalent metal salts are composed of a polyvalent metal ion with a valency of two or more and an anion to be bound to the polyvalent metal ion and are soluble in water. Specific examples of the polyvalent metal ion include divalent metal ions, such as $Ca^{2+}$, $Cu^{2+}$, $Ni^{2+}$, $Mg^{2+}$, $Zn^{2+}$, and $Ba^{2+}$, and trivalent metal ions, such as $Al^{3+}$, $Fe^{3+}$, and $Cr^{3+}$. Examples of the anion include $Cl^-$, $I^-$, $Br^-$, $SO_4^{2-}$, $ClO_3^-$, $NO_3^-$, $HCOO^-$, and $CH_3COO^-$. Among these polyvalent metal salts, calcium salts and magnesium salts are preferred in terms of the stability of the pretreatment liquid and reactivity as aggregating agents.

Examples of the cationic polymers include cationic urethane resins, cationic olefin resins, and cationic allylamine resins.

The cationic urethane resins can be appropriately selected from known cationic urethane resins. The cationic urethane resins may be commercial products, for example, Hydran CP-7010, CP-7020, CP-7030, CP-7040, CP-7050, CP-7060, and CP-7610 (trade names, manufactured by DIC Corporation), Superflex 600, 610, 620, 630, 640, and 650 (trade names, manufactured by Dai-ichi Kogyo Seiyaku Co., Ltd.), and urethane emulsions WBR-2120C and WBR-2122C (trade names, manufactured by Taisei Fine Chemical Co., Ltd.).

The cationic olefin resins have a skeleton of olefin, such as ethylene and/or propylene, and can be appropriately selected from known cationic olefin resins. The cationic olefin resins may be dispersed in a solvent containing water and/or an organic solvent and may form emulsions. The cationic olefin resins may be commercial products, for example, Arrowbase CB-1200 and CD-1200 (trade names, manufactured by Unitika Ltd.).

The cationic allylamine resins may be appropriately selected from known cationic allylamine resins, for example, polyallylamine hydrochloride, polyallylamine-amide sulfate, allylamine hydrochloride-diallylamine hydrochloride copolymers, allylamine acetate-diallylamine acetate copolymers, allylamine acetate-diallylamine acetate copolymers, allylamine hydrochloride-dimethylallylamine hydrochloride copolymers, allylamine-dimethylallylamine copolymers, polydiallylamine hydrochloride, polymethyldiallylamine hydrochloride, polymethyldiallylamineamide sulfate, polymethyldiallylamine acetate, polydiallyldimethylammonium chloride, diallylamine acetate-sulfur dioxide copolymers, diallylmethylethylammonium ethyl sulfate-sulfur dioxide copolymers, methyldiallylamine hydrochloride-sulfur dioxide copolymers, diallyldimethylammonium chloride-sulfur dioxide copolymers, and diallyldimethylammonium chloride-acrylamide copolymers. The cationic allylamine resins may be commercial products, for example, PAA-HCL-01, PAA-HCL-03, PAA-HCL-05, PAA-HCL-3L, PAA-HCL-10L, PAA-H-HCL, PAA-SA, PAA-01, PAA-03, PAA-05, PAA-08, PAA-15, PAA-15C, PAA-25, PAA-H-10C, PAA-D11-HCL, PAA-D41-HCL, PAA-D19-HCL, PAS-21CL, PAS-M-1L, PAS-M-1, PAS-22SA, PAS-M-1A, PAS-H-1L, PAS-H-5L, PAS-H-10L, PAS-92, PAS-92A, PAS-J-81L, and PAS-J-81 (trade names, manufactured by Nittobo Medical Co., Ltd.), and Hymo Neo-600, Himoloc Q-101, Q-311, and Q-501, and Himax SC-505 and SC-505 (trade names, manufactured by Hymo Corporation). Neofix RP-(trade name, manufactured by Nicca Chemical Co., Ltd.), which is a product containing a cationic polymer and a metal salt, may also be used.

Examples of the cationic surfactants include primary, secondary, and tertiary amine salt compounds, alkylamine salts, dialkylamine salts, aliphatic amine salts, benzalkonium salts, quaternary ammonium salts, quaternary alkylammonium salts, alkylpyridinium salts, sulfonium salts, phosphonium salts, onium salts, and imidazolinium salts. Specific examples of the cationic surfactants include hydrochlorides and acetates of lauryl amine, coconut amine, and rosin amine, lauryltrimethylammonium chloride, cetyltrimethylammonium chloride, benzyltributylammonium chloride, benzalkonium chloride, dimethylethyllaurylammoniumethyl sulfate, dimethylethyloctylammoniumethyl sulfate, trimethyllaurylammonium hydrochloride, cetylpyridinium chloride, cetylpyridinium bromide, dihydroxyethyllauryl amine, decyldimethylbenzylammonium chloride, dodecyldimethylbenzylammonium chloride, tetradecyldimethylammonium chloride, hexadecyldimethylammonium chloride, and octadecyldimethylammonium chloride.

The concentration of the cationic compound may be 0.03 mol or more per kilogram of the pretreatment liquid. The concentration of the cationic compound may range from 0.1 to 1.5 mol or 0.2 to 0.9 mol per kilogram of the pretreatment liquid. For example, the cationic compound content preferably ranges from 0.1% to 25% by mass, more preferably 1% to 10% by mass, still more preferably 2% to 7% by mass, of the total mass (100% by mass) of the pretreatment liquid.

A reaction of the cationic compound with a resin in the ink composition can be examined by the aggregation of the resin in a "resin aggregation test", for example. In the "resin aggregation test", for example, a solution containing a predetermined concentration of an aggregating agent is added dropwise to a resin liquid containing a predetermined concentration of resin while stirring, and is visually inspected for precipitate in the liquid mixture.

1.3.6. Organic Solvent

The pretreatment liquid according to the present embodiment may contain an organic solvent. The organic solvent can improve the wettability of the pretreatment liquid to a textile recording medium. The organic solvent described above in Ink Composition can be used. The organic solvent content may be, but is not limited to, 0.1% to 20% by mass, preferably 0.3% to 15% by mass, more preferably 0.5% to 10% by mass, of the total mass (100% by mass) of the pretreatment liquid.

1.3.7. Surfactant

The pretreatment liquid according to the present embodiment may contain a surfactant. The surfactant may be the cationic surfactant described above or may be a nonionic surfactant, an anionic surfactant, or an amphoteric surfactant. These surfactants may be used in combination. The surfactant can decrease the interfacial tension of the pretreatment liquid and thereby facilitate the penetration of the pretreatment liquid into a textile.

The total amount of surfactant, if present, in the pretreatment liquid is preferably less than 0.5% by mass, more preferably less than 0.1% by mass, still more preferably less than 0.05% by mass, particularly preferably less than 0.01% by mass, of the pretreatment liquid. The surfactant is an optional component in the pretreatment liquid. The pretreatment liquid containing no surfactant also has satisfactory functions and effects.

The nonionic surfactant is preferably at least one of acetylenic glycol surfactants, acetylenic alcohol surfactants, fluorinated surfactants, and polysiloxane surfactants. The pretreatment liquid containing such a surfactant has improved wettability to a textile and improved pigment dispersion stability.

Examples of the acetylenic glycol surfactants and acetylenic alcohol surfactants include, but are not limited to, 2,4,7,9-tetramethyl-5-decyne-4,7-diol, alkylene oxide adducts of 2,4,7,9-tetramethyl-5-decyne-4,7-diol, 2,4-dimethyl-5-decyn-4-ol, and alkylene oxide adducts of 2,4-dimethyl-5-decyn-4-ol, 3,6-dimethyl-4-octyne-3,6-diol, 3,5-dimethyl-1-hexyn-3-ol, and 2,4-dimethyl-5-hexyn-3-ol. The acetylenic glycol surfactants and acetylenic alcohol surfactants may be commercial products, for example, Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, and GA (trade names, manufactured by Air Products Japan, Inc.), Olfin B, Y, P, A, STG, SPC, E1004, E1010, PD-001, PD-002W, PD-003, PD-004, EXP. 4001, EXP. 4036, EXP. 4051, AF-103, AF-104, AK-02, SK-14, and AE-3 (trade names, manufactured by Nissin Chemical Industry Co., Ltd.), and Acetylenol E00, E00P, E40, and E100 (trade names, manufactured by Kawaken Fine Chemicals Co., Ltd.).

The fluorinated surfactants may be commercial products, for example, Megaface F-479 (manufactured by DIC Corporation) and BYK-340 (manufactured by BYK Japan KK).

The polysiloxane surfactants may be commercial products, for example, Olfin PD-501, Olfin PD-502, and Olfin PD-570 (manufactured by Nissin Chemical Industry Co., Ltd.), and BYK-347, BYK-348, and BYK-302 (manufactured by BYK Japan KK).

Although BYK-348 and BYK-302 are siloxane surfactants (silicon surfactants), BYK-302 is more suitable for a reaction liquid due to its lower ability to reduce the interfacial tension of the reaction liquid than BYK-348.

The nonionic surfactant may be a polyoxyethylene alkyl ether, a polyoxyethylene alkylphenyl ether, an alkyl glucoside, a polyoxyalkyleneglycol alkyl ether, a polyoxyalkylene glycol, a polyoxyalkyleneglycol alkylphenyl ether, a sucrose fatty acid ester, a polyoxyethylene fatty acid ester, a polyoxyethylene sorbitan fatty acid ester, a sorbitan fatty acid ester, a polyoxyalkylene acetylenic glycol, a polyoxyalkyleneglycol alkylamine, a polyoxyethylene alkylamine, a polyoxyethylene alkylamine oxide, a fatty acid alkanolamide, an alkylolamide, or a polyoxyethylene polyoxypropylene block polymer.

The anionic surfactant may be a higher fatty acid salt, a soap, an α-sulfo fatty acid methyl ester salt, a linear alkylbenzene sulfonate, an alkyl sulfate ester salt, an alkyl ether sulfate ester salt, a monoalkyl phosphate ester salt, an α-olefin sulfonate, an alkylbenzene sulfonate, an alkylnaphthalene sulfonate, a naphthalene sulfonate, an alkane sulfonate, a polyoxyethylene alkyl ether sulfate, a sulfosuccinate, or a polyoxyalkyleneglycol alkyl ether phosphate salt.

The amphoteric surfactant may be an amino acid, such as an alkylamino fatty acid salt, a betaine, such as an alkylcarboxyl betaine, or an amine oxide, such as an alkylamine oxide. The amphoteric surfactant is not limited to these. The surfactants may be used in combination.

The surfactant content may be, but is not limited to, 0.1% to 1.5% by mass of the total mass (100% by mass) of the pretreatment liquid.

1.3.8. Other Components

The pretreatment liquid in the present embodiment may contain a pH-adjusting agent, a preservative and fungicide, an anticorrosive, and/or a chelating agent, as required. An organic solvent described above in Ink Composition can be uses as another component.

1.3.9. Method for Preparing Pretreatment Liquid

The pretreatment liquid in the present embodiment can be produced by dispersing and mixing the components by an appropriate method. The components can be well stirred and filtered to remove coarse particles and foreign matter responsible for clogging, thus producing the pretreatment liquid.

1.3.10. Physical Properties of Pretreatment Liquid

When the pretreatment liquid in the present embodiment is ejected from an ink jet recording head, the pretreatment liquid preferably has a surface tension in the range of 20 to 40 mN/m, more preferably 20 to 35 mN/m, at 20° C. The surface tension can be measured, for example, by wetting a platinum plate with ink in an automatic surface tensiometer CBVP-Z (trade name, manufactured by Kyowa Interface Science Co., Ltd.) at 20° C.

From the same perspective, the pretreatment liquid in the present embodiment preferably has a viscosity in the range of 3 to 10 mPa·s, more preferably 3 to 8 mPa·s, at 20° C. The viscosity can be measured, for example, with a viscoelastometer MCR-300 (trade name, manufactured by Physica) at 20° C.

1.4. Textile

A textile is used in the recording method according to the present embodiment. The material for the textile may be, but is not limited to, natural fiber, such as cotton, hemp, wool, or silk, synthetic fiber, such as polypropylene, polyester, acetate, triacetate, polyamide, or polyurethane, biodegradable fiber, such as poly(lactic acid), or mixed fiber thereof. The textile may be a fabric, knit fabric, or nonwoven fabric of the fiber. Among these, the textile for use in the present embodiment is more preferably formed of fiber containing cellulose, such as cotton or hemp. Such a textile can improve the fixability of the pigment.

The mass per unit area of a textile for use in the present embodiment ranges from 1.0 to 10.0 oz (ounce), preferably 2.0 to 9.0 oz, more preferably 3.0 to 8.0 oz, still more preferably 4.0 to 7.0 oz. A textile with a mass per unit area in this range can provide satisfactory recording (textile printing) in the recording method according to the present embodiment. The recording method according to the present embodiment can be applied to textiles with different masses per unit area and can perform satisfactory recording on the textiles.

1.5. Recording Method

Each process of the recording method according to the present embodiment will be described below. The recording method according to the present embodiment includes applying the pretreatment liquid according to the present embodiment to a textile and applying by an ink jet method an ink composition containing a pigment to a region of the textile to which the pretreatment liquid is applied. Each process of the recording method according to the present embodiment will be described in detail below.

1.5.1. Pretreatment Liquid Application Process

The pretreatment liquid application process includes applying the pretreatment liquid according to the present embodiment to at least part of a textile recording medium before the ink composition containing a pigment is applied to the textile by an ink jet method.

For example, the amount of pretreatment liquid to be deposited preferably ranges from 0.02 to 0.5 g/cm$^2$, more preferably 0.02 to 0.24 g/cm$^2$. An amount of pretreatment liquid to be deposited in this range results in uniform application of the pretreatment liquid to the textile, reduced uneven aggregation in images, and improved color developability.

In the pretreatment liquid application process, the amount of polyvalent metal salt in the pretreatment liquid deposited on the textile preferably ranges from 1.6 to 6 µmol/cm$^2$, more preferably 2 to 5 µmol/cm$^2$. When the amount of deposited polyvalent metal salt is 1.6 µmol/cm$^2$ or more, recorded images have improved color developability. When the amount of deposited polyvalent metal salt is 6 µmol/cm$^2$ or less, recorded images have satisfactory wet friction fastness and dry friction fastness.

A method for applying the pretreatment liquid to a textile may be a method of dipping the textile in the pretreatment liquid (dip application), a method of applying the pretreatment liquid with a roll coater (roller application), a method of spraying the pretreatment liquid with a spray unit (spray application), or a method of ejecting the pretreatment liquid by an ink jet method (ink jet application).

Among these methods, contact and non-contact methods such as dip application, roller application, and spray application are preferred in terms of simple system configuration and rapid application of the pretreatment liquid. These methods may be combined. Ink jet application is more preferred in terms of easy and precise application of the pretreatment liquid to a specified position, reduced usage of the pretreatment liquid, and uniform application of the pretreatment liquid to a textile. Ink jet application can uniformly apply the pretreatment liquid to a textile, thereby improving the color development of a printed textile and maintaining the feel and texture of the textile.

The recording method according to the present embodiment may include a pretreatment liquid drying process of drying the pretreatment liquid deposited on a textile after the pretreatment liquid application process. However, the pretreatment liquid drying process is preferably omitted in order to improve dry friction fastness. Without the pretreatment liquid drying process, the pretreatment liquid can come into contact with and can be mixed with the ink composition on the recording medium. Dry friction fastness is improved probably because a lubricant in the pretreatment liquid can flow in the mixture of the pretreatment liquid and the ink composition and tends to remain on the surface. Although the pretreatment liquid drying process, if present, may be natural drying, drying by heating is preferred due to high drying speed. Heating in the pretreatment liquid drying process may be performed by any heating method, for example, a heat press method, a normal-pressure steam method, a high-pressure steam method, or a Thermofix method. The heat source may be, but is not limited to, infrared light (lamp).

1.5.2. Ink Composition Application Process

The ink composition application process includes applying the ink composition containing a pigment through an ink jet head nozzle by an ink jet method to a region of a textile to which the pretreatment liquid is applied. In this process, ink droplets are deposited on the textile to record an image on the textile. An image formed of the ink composition is recorded on the textile, thus producing recorded matter (printed matter, printed textile).

In the present embodiment, the pretreatment liquid according to the present embodiment is applied to a textile, and the ink composition containing a pigment is applied by an ink jet method to at least part of a region of the textile to which the pretreatment liquid is applied. In the present embodiment, a component, such as the pigment, in the ink composition reacts with a cationic compound in the pretreatment liquid and aggregates on a textile, thereby providing an image with high color developability. Furthermore, a reaction between the pigment and the cationic compound of the pretreatment liquid improves the wet friction fastness and dry friction fastness of a recorded image.

Thus, in the present embodiment, the pretreatment liquid can improve the fastness of a printed textile and reduce the amount of resin dispersion in the ink. Thus, the recording method according to the present embodiment has satisfactory ejection stability and improves the wet friction fastness and dry friction fastness of a recorded image.

The ink composition application process may include heating. The heating refers to heating at least one of ink, an ink jet head, or a textile by a heating mechanism, such as a heater, when the ink composition is applied to a recording medium through the ink jet head. The temperature of the ink, ink jet head, or textile is higher than the temperature of unheated ink, ink jet head, or textile.

The heating may be performed with a heater attached to a textile supporting portion (platen).

The temperature may be determined by measuring the textile surface temperature (the surface temperature of a textile facing the head in the textile transport direction) with a non-contact thermometer (for example, trade name "IT2-80", manufactured by Keyence Corporation) during ink application (during recording). When the textile supporting portion (platen) is heated with a heater, the ambient temperature may also be increased, and the ink jet head and the ink may be heated.

In the recording method according to the present embodiment, recording can be performed at a temperature in the range of 15° C. to 40° C., 15° C. to 35° C., or 20° C. to 30° C. Due to the pretreatment liquid application process including the use of the pretreatment liquid, the recording method according to the present embodiment has satisfactory ejection stability in a wide temperature range and provides recorded matter with wet friction fastness and dry friction fastness.

The ink jet recording method for ejecting the ink composition may be any method, for example, a charge deflection method, a continuous method, or an on-demand method (a piezoelectric method or a Bubble Jet (registered trademark) method). Among these ink jet recording methods, a method with a piezoelectric ink jet recording apparatus is particularly preferred.

In the ink composition application process, the amount of ink composition to be deposited on a textile preferably ranges from 1.5 to 6 mg/cm$^2$, more preferably 2 to mg/cm$^2$. When the amount of ink composition to be deposited is 1.5 mg/cm$^2$ or more, the recorded image has high color developability, satisfactory drying characteristics, and reduced blurring.

1.5.3. Other Processes

The recording method according to the present embodiment may include a process of heating or drying a textile with a second heating mechanism disposed downstream from the heating mechanism 6 in the textile M transport direction in the FIGURE after the ink composition application process. The second heating mechanism can improve the drying characteristics of ink droplets on the textile M. The ink composition on a textile may be heated by a heat press method, a normal-pressure steam method, a high-pressure steam method, a hot-air drying method, or a Thermofix method. The second heating mechanism may be, but is not limited to, any of the mechanisms described above for the heating mechanism 6 (for example, a dryer mechanism, etc.).

In this case, the heating temperature is preferably, but not limited to, 80° C. to 200° C., more preferably 100° C. to 180° C. A heating temperature in this range results in reduced damage to a textile and promoted film formation of the resin of the ink composition. The heating time may be, but is not limited to, 30 seconds to 20 minutes, preferably 2 to 7 minutes, more preferably 3 to 5 minutes. A heating time in this range results in reduced damage to a textile and sufficient drying of the ink.

Through this process, the resin dispersion and a cross-linking group of a cross-linker in the pretreatment liquid and the ink composition are allowed to react and form a cross-linked structure. Thus, a strong resin film is formed, and the pigment is fixed to the textile.

1.6. Operational Advantages

As described above, the pretreatment liquid according to the present embodiment contains at least one of a resin dispersion and a cross-linker, a lubricant, and water, and a recording method with an ink set including the pretreatment liquid can produce a printed textile with wet friction fastness and dry friction fastness. An improvement in wet friction fastness and dry friction fastness due to the pretreatment liquid can reduce the amount of component, such as resin, in the ink composition and thereby improve ink ejection stability.

In the invention, instead of the ink composition or a posttreatment liquid (overcoat), the pretreatment liquid containing the components of the present embodiment provides advantages. The addition of a lubricant, cross-linker, or resin dispersion to the ink composition rather than the use of the pretreatment liquid restricts the type and amount of another component in the ink composition and is therefore unfavorable in terms of design flexibility. For example, an increase in solid content may result in poor ejection stability.

The use of a posttreatment liquid (overcoat) after the application of the ink composition and the addition of a lubricant, cross-linker, or a resin dispersion to the posttreatment liquid instead of the pretreatment liquid are less likely to produce the effects of scaffold reinforcement on fiber resulting from the interaction between the cross-linker or resin dispersion and the textile surface and are less likely to improve fastness. Furthermore, additional pretreatment with the pretreatment liquid containing a cationic compound to improve color development results in multiple processes including pretreatment, ink application, and posttreatment, thus resulting in lower productivity.

2. Examples and Comparative Examples

Although the invention will be further described with examples, the invention is not limited to these examples.

2.1. Preparation of Ink Composition

The components of each composition listed in Table 1 were mixed in a container with a magnetic stirrer for 2 hours and were further dispersed in a bead mill filled with zirconia beads 0.3 mm in diameter. After stirring for 1 hour, the mixture was filtered through a 5-μm PTFE membrane filter to prepare an ink composition. The values in Table 1 are expressed in % by mass, and pure water (ion-exchanged water) was added such that the mass of each ink composition was 100% by mass. The resin dispersion content and the cross-linker content are based on solids.

TABLE 1

| Ink composition Amount (mass %) | | Ink 1 | Ink 2 |
|---|---|---|---|
| Pigment | Pigment Blue 15:4 | 4 | 4 |
| Resin dispersion | Ucoat UA-368 | 10 | — |
| Cross-linker | Elastron BN-11 | — | 10 |
| Surfactant | Olfin E1010 | 1.2 | 1.2 |
| pH-adjusting agent | triisopropanolamine | 0.5 | 0.5 |
| Preservative and fungicide | Proxel XL2 | 0.3 | 0.3 |
| Pure water | | Remainder | Remainder |

The components in Table 1 are described in detail below.

Resin Dispersion
  Ucoat UA-368 (trade name, manufactured by Sanyo Chemical Industries, Ltd., anionic self-emulsifiable polycarbonate resin)

Cross-Linker
  Elastron BN-11 (trade name, manufactured by Dai-ichi Kogyo Seiyaku Co., Ltd., blocked cyanate cross-linker)

Surfactant
  Olfin E1010 (trade name, manufactured by Air Products, acetylenic glycol surfactant) Preservative and Fungicide Proxel XL2 (trade name, manufactured by Avecia Ltd., preservative and fungicide)

2.2. Preparation of Pretreatment Liquid

The components listed in Tables 2 and 3 were mixed at the specified ratio to prepare each pretreatment liquid. Pure water (ion-exchanged water) was added such that the total mass of each treatment liquid was 100% by mass. The cationic compound, lubricant, cross-linker, and resin dispersion contents are based on solids.

TABLE 2

| Pretreatment liquid composition Amount (mass %) | | Example 1 | Example 2 | Example 3 | Example 4 | Example 5 | Example 6 | Example 7 | Example 8 |
|---|---|---|---|---|---|---|---|---|---|
| Cationic Compound | PAA-HCl-05 | | | 5 | 5 | 5 | 5 | 5 | 5 |
| | Neofix RP-70 | | | | | | | | |
| Lubricant | AQUACER515 | 1 | 1 | 1 | 1 | 1 | 1 | 1 | 1 |
| | AQUACER1547 | | | | | | | | |
| | AQUACER840 | | | | | | | | |
| Cross-linker | Elastron BN-11 | 10 | 10 | 10 | | | | | |
| | Elastron BN-77 | | | | 10 | | | | |
| Resin Dispersion | Superflex 500M | | | | | 10 | 10 | | |
| | Mowinyl 6960 | | | | | | | 10 | |
| | Ucoat UA-368 | | | | | | | | 10 |
| | Pure water | Remainder | Remainder | Remainder | Remainder | Remainder | Remainder | Remainder | Remainder |
| | Application method | Ink jet | Ink jet | Ink jet | Ink jet | Ink jet | Ink jet | Ink jet | Ink jet |
| | Recording medium | Textile | Textile | Textile | Textile | Textile | Textile | Textile | Textile |
| | Ink | Ink 1 | Ink 2 | Ink 1 | Ink 1 | Ink 1 | Ink 2 | Ink 1 | Ink 1 |
| | Migration dry friction fastness | A | A | A | A | A | A | A | A |
| | Migration wet friction fastness | A | A | A | B | A | A | A | A |
| | Color development | B | B | A | A | A | A | A | B |
| | Feel and texture | C | B | A | A | C | B | C | C |

| Pretreatment liquid composition Amount (mass %) | | Example 9 | Example 10 | Example 11 | Example 12 | Example 13 |
|---|---|---|---|---|---|---|
| Cationic Compound | PAA-HCl-05 | 5 | 5 | 5 | 5 | |
| | Neofix RP-70 | | | | | 5 |
| Lubricant | AQUACER515 | | | 1 | 1 | 1 |
| | AQUACER1547 | 1 | | | | |
| | AQUACER840 | | 1 | | | |
| Cross-linker | Elastron BN-11 | 10 | 10 | 5 | 5 | 10 |
| | Elastron BN-77 | | | | | |
| Resin Dispersion | Superflex 500M | | | 5 | 5 | |
| | Mowinyl 6960 | | | | | |
| | Ucoat UA-368 | | | | | |
| | Pure water | Remainder | Remainder | Remainder | Remainder | Remainder |
| | Application method | Ink jet | Ink jet | Ink jet | Spraying | Ink jet |
| | Recording medium | Textile | Textile | Textile | Textile | Textile |
| | Ink | Ink 1 | Ink 1 | Ink 1 | Ink 1 | Ink 1 |
| | Migration dry friction fastness | A | A | A | A | A |
| | Migration wet friction fastness | A | A | A | A | A |
| | Color development | A | A | A | A | A |
| | Feel and texture | A | A | B | C | A |

TABLE 3

| Pretreatment liquid composition Amount (mass %) | | Example 14 | Example 15 | Example 16 | Comparative example 1 | Comparative example 2 |
|---|---|---|---|---|---|---|
| Cationic Compound | PAA-HCl-05 | | | 5 | No pretreatment | 5 |
| | Neofix RP-70 | 5 | 5 | | | |
| Lubricant | AQUACER515 | 1 | 1 | 1 | | |
| | AQUACER1547 | | | | | |
| | AQUACER840 | | | | | |
| Cross-linker | Elastron BN-11 | | 5 | | | |
| | Elastron BN-77 | | | | | |
| Resin Dispersion | Superflex 500M | 10 | 5 | 20 | | |
| | Mowinyl 6960 | | | | | |
| | Ucoat UA-368 | | | | | |
| | Pure water | Remainder | Remainder | Remainder | | Remainder |
| | Application method | Ink jet | Ink jet | Ink jet | Ink jet | Ink jet |
| | Recording medium | Textile | Textile | Textile | Textile | Textile |
| | Ink | Ink 1 | Ink 1 | Ink 1 | Ink 1 | Ink 1 |
| Migration dry friction fastness | | A | A | A | C | D |
| Migration wet friction fastness | | A | A | A | C | D |
| Color development | | A | A | A | B | A |
| Feel and texture | | C | B | D | A | A |

| Pretreatment liquid composition Amount (mass %) | | Comparative example 3 | Comparative example 4 | Comparative example 5 | Comparative example 6 | Comparative example 7 |
|---|---|---|---|---|---|---|
| Cationic Compound | PAA-HCl-05 | 5 | | | No pretreatment | 5 |
| | Neofix RP-70 | | | | | |
| Lubricant | AQUACER515 | | 1 | | | 1 |
| | AQUACER1547 | | | | | |
| | AQUACER840 | | | | | |
| Cross-linker | Elastron BN-11 | 10 | | | | 5 |
| | Elastron BN-77 | | | | | |
| Resin Dispersion | Superflex 500M | | | 10 | | 5 |
| | Mowinyl 6960 | | | | | |
| | Ucoat UA-368 | | | | | |
| | Pure water | Remainder | Remainder | Remainder | | Remainder |
| | Application method | Ink jet | Ink jet | Ink jet | Ink jet | Ink jet |
| | Recording medium | Textile | Textile | Textile | PET film | PET film |
| | Ink | Ink 1 | Ink 1 | Ink 1 | Ink 1 | Ink 1 |
| Migration dry friction fastness | | D | A | C | C | C |
| Migration wet friction fastness | | B | C | B | C | B |
| Color development | | A | B | B | B | A |
| Feel and texture | | B | A | B | — | — |

The components listed in Tables 2 and 3 are described in detail below.

Cationic Compound
  PAA-H-HCL (trade name, manufactured by Nittobo Medical Co., Ltd., cationic allylamine resin)
  Neofix RP-70 (trade name, manufactured by Nicca Chemical Co., Ltd., cationic resin) Lubricant
  AQUACER 515 (trade name, manufactured by BYK Japan KK, nonionic, forcibly emulsifiable lubricant)
  AQUACER 1547 (trade name, manufactured by BYK Japan KK, anionic, forcibly emulsifiable lubricant)
  AQUACER 840 (trade name, manufactured by BYK Japan KK, cationic, forcibly emulsifiable lubricant)
Cross-linker
  Elastron BN-11 (trade name, manufactured by Dai-ichi Kogyo Seiyaku Co., Ltd., nonionic blocked cyanate cross-linker)
  Elastron BN-77 (trade name, manufactured by Dai-ichi Kogyo Seiyaku Co., Ltd., anionic blocked cyanate cross-linker)
Resin Dispersion
  Superflex 500M (trade name, manufactured by Dai-ichi Kogyo Seiyaku Co., Ltd., nonionic self-emulsifiable urethane resin)
  Mowinyl 6960 (trade name, manufactured by The Nippon Synthetic Chemical Industry Co., Ltd., anionic forcibly emulsifiable styrene-acrylic resin)
  Ucoat UA-368 (trade name, manufactured by Sanyo Chemical Industries, Ltd., anionic self-emulsifiable polycarbonate resin emulsion)

2.3. Evaluation Test
2.3.1. Preparation of Printed Textile

An array of nozzles in a head of a modified printer of SC-F2000 (manufactured by Seiko Epson Corporation) was filled with ink. Printing was performed under the conditions listed in Tables 2 and 3 at a resolution of 1440 dpi×1440 dpi and at an application weight of 200 mg/inch$^2$. After the printing, a printed textile was fixed by heat treatment in a conveyer oven (a hot-air drying method) at 165° C. for 5 minutes. In Comparative Examples 1 and 6, the pretreatment liquid was not applied. In Example 12, spray application was employed. In the other examples, the pretreatment liquid charged in another array of nozzles was applied before ink application. A white cotton broadcloth made of 100% cotton was used as a textile. In Comparative Examples 6 and 7, a PET film (manufactured by Toray Industries, Inc., PET film "Lumirror S10") was used instead of the textile.

2.3.2. Migration Dry Friction Fastness Test

The printed textiles of the examples were examined in a dry test specified in JIS L 0849 "Test methods for color fastness to rubbing". The results were rated according to the following criteria. The test was performed by a crockmeter method. The stain rating of each printed textile was determined by a visual method according to article 10 (determination of color fastness) of JIS L 0801 cited in JIS L 0849. A and B ratings indicate satisfactory migration dry friction fastness.

Evaluation Criteria
  A: friction fastness of 4-5 (intermediate) to 5.
  B: friction fastness of 3-4 (intermediate) to 4.
  C: friction fastness of 2-3 (intermediate) to 3.
  D: friction fastness of 2 or less.

2.3.3. Migration Wet Friction Fastness Test

The printed textiles of the examples were examined in a wet test specified in JIS L 0849 "Test methods for color fastness to rubbing". The results were rated according to the following criteria. The test was performed by a crockmeter method. The stain rating of each printed textile was determined by a visual method according to article 10 (determination of color fastness) of JIS L 0801 cited in JIS L 0849. A and B ratings indicate satisfactory migration wet friction fastness.

Evaluation Criterion
  A: friction fastness of 4-5 (intermediate) to 5.
  B: friction fastness of 3-4 (intermediate) to 4.
  C: friction fastness of 2-3 (intermediate) to 3.
  D: friction fastness of 2 or less.

2.3.4. Evaluation of Color Development

A recorded portion of a printed textile was visually inspected in each example.

Evaluation Criteria
  A: No blurring is observed.
  B: Blurring is partly observed.

2.3.5. Evaluation of Feel and Texture

The feel and texture of each printed textile was organoleptically evaluated. More specifically, five judges determined whether "comparable to the original texture of the textile" or "rough texture with a loss of the original texture of the textile". The following are ratings.

Evaluation Criteria
  A: Four or more judges answered "comparable to the original texture of the textile".
  B: Three judges answered "comparable to the original texture of the textile".
  C: One to three judges answered "comparable to the original texture of the textile".
  D: All judges answered "rough texture with a loss of the original texture of the textile".

2.4. Evaluation Results

Examples 1 to 16 had high wet friction fastness and dry friction fastness. More specifically, Examples 1 to 16 are rated A or B for migration wet friction fastness and migration dry friction fastness. In particular, Examples 3 to 7, 9 to 12, and 16, in which the pretreatment liquid contained the cationic compound, showed higher color development than Examples 1 and 2. Almost the same results were obtained in Examples 13 to 15, which contained a different cationic compound from that in Examples 3, 5, and 11. Example 8, which contained a self-emulsifiable anionic dispersion as a resin dispersion instead of the nonionic dispersion, cationic dispersion, or forcibly emulsifiable (emulsifier-dispersible) anionic dispersion, had color development and feel and texture inferior to the other examples. This is probably because the use of the self-emulsifiable dispersion resulted in aggregation of a component. Example 4, which contained a self-emulsifiable anionic dispersion as a cross-linker, had slightly lower wet friction fastness than Example 3, which contained a nonionic dispersion. This is probably because the use of the self-emulsifiable anionic dispersion resulted in aggregation of a component and reduced the intrinsic effects of the cross-linker. In particular, when used in combination with a cationic compound, the self-emulsifiable anionic dispersion reacts with a cation of the cationic compound and thereby also causes aggregation of a component. A nonionic dispersion is less likely to cause such a reaction and aggregation and can improve wet friction fastness. Example 12, in which the pretreatment liquid was applied by spraying, resulted in nonuniform application and poorer feel and texture than Example 11. A comparison of Examples 3 and 4 with Examples 5 to 8 showed that the pretreatment liquid containing a cross-linker more successfully maintained feel and texture than the pretreatment liquid containing a resin dispersion. Example 16 had poor feel and texture due to too much resin. A comparison of Examples 1 and 2 with Examples 5 and 6 showed that the ink composition containing a cross-linker had better feel and texture than the ink composition containing a resin.

Comparative Examples 1 to 5 had lower wet friction fastness and/or dry friction fastness than Examples. More specifically, at least one of migration wet friction fastness and migration dry friction fastness was rated C or D. In particular, Comparative Example 1, in which the pretreatment liquid was not applied, had not only low friction fastness but also poor color development. Without the pretreatment liquid, however, the feel and texture was maintained. Comparative Example 2, in which the pretreatment liquid contained only a cationic compound, had good color development but low wet friction fastness and dry friction fastness. Comparative Example 3, in which the pretreatment liquid contained a cross-linker and no lubricant, had low dry friction fastness. Comparative Example 4, in which the pretreatment liquid contained a lubricant, no cross-linker, and no resin dispersion, had low wet friction fastness. Comparative Example 5, in which the pretreatment liquid contained a resin dispersion and no lubricant, had low dry friction fastness.

A comparison of Comparative Examples 6 and 7, which included the PET film as a recording medium instead of the textile, showed that the pretreatment liquid improved wet friction fastness and color development but had no effects on dry friction fastness. This is probably due to a lack of the effects of a lubricant contained in the pretreatment liquid. For a textile recording medium, a lubricant in the pretreatment liquid remains around the surface of the textile, the ink can easily penetrate into the textile, and the lubricant can easily contribute to improved friction fastness. By contrast, for a PET film recording medium, an ink layer is formed on the pretreatment liquid, and a lubricant in the pretreatment liquid is less likely to remain around the surface and could not improve dry friction fastness.

The invention is not limited to the embodiments described above, and various modifications may be made therein. For example, the invention includes substantially the same constitutions as those described in the embodiments (for example, constitutions with the same functions, methods, and results, or constitutions with the same objects and advantages). The invention also includes constitutions in which unessential portions of the constitutions described in the embodiments are substituted. The invention also includes other constitutions that have the operational advantages of the constitutions described in the embodiments and other constitutions with which the same objects can be achieved. The invention also includes constitutions in which the constitutions described in the embodiments are combined with known techniques.

The entire disclosure of Japanese Patent Application No. 2017-063134, filed Mar. 28, 2017 is expressly incorporated by reference herein.

What is claimed is:

1. A pretreatment liquid for use in ink jet pigment textile printing, comprising:
   a resin dispersion;
   a cross-linker;
   a lubricant that is any one selected from a group consisting of silicone wax, polyolefin wax, and paraffin wax; and
   water;
   wherein the cross-linker is either a compound having a plurality of oxazoline groups or a compound having a plurality of terminal blocked isocyanate groups.

2. The pretreatment liquid according to claim 1, further comprising:
   a cationic compound,
   wherein the cationic compound is any one selected from the group consisting of polyvalent metal salts, cationic polymers, and cationic surfactants.

3. The pretreatment liquid according to claim 1, wherein the resin dispersion is any one selected from the group consisting of nonionic dispersions, cationic dispersions, and emulsifier-dispersible anionic dispersions.

4. The pretreatment liquid according to claim 1, wherein the cross-linker is any one selected from the group consisting of nonionic dispersions, cationic dispersions, and emulsifier-dispersible anionic dispersions.

5. The pretreatment liquid according to claim 1, wherein the lubricant is any one selected from the group consisting of nonionic dispersions, cationic dispersions, and emulsifier-dispersible anionic dispersions.

6. The pretreatment liquid according to claim 1, wherein the resin dispersion has a solid content of 10% or less by mass based on a total mass of the pretreatment liquid.

7. An ink set comprising:
   the treatment liquid according to claim 1; and
   an ink composition containing a pigment.

8. An ink set comprising:
   the treatment liquid according to claim 2; and
   an ink composition containing a pigment.

9. An ink set comprising:
   the treatment liquid according to claim 3; and
   an ink composition containing a pigment.

10. An ink set comprising:
    the treatment liquid according to claim 4; and
    an ink composition containing a pigment.

11. An ink set comprising:
    the treatment liquid according to claim 5; and
    an ink composition containing a pigment.

12. An ink set comprising:
    the treatment liquid according to claim 6; and
    an ink composition containing a pigment.

13. A recording method comprising:
    applying the pretreatment liquid according to claim 1 to a textile; and
    applying by an ink jet method an ink composition containing a pigment to a region of the textile to which the pretreatment liquid is applied.

14. A recording method comprising:
    applying the pretreatment liquid according to claim 2 to a textile; and
    applying by an ink jet method an ink composition containing a pigment to a region of the textile to which the pretreatment liquid is applied.

15. A recording method comprising:
    applying the pretreatment liquid according to claim 3 to a textile; and
    applying by an ink jet method an ink composition containing a pigment to a region of the textile to which the pretreatment liquid is applied.

16. A recording method comprising:
    applying the pretreatment liquid according to claim 4 to a textile; and
    applying by an ink jet method an ink composition containing a pigment to a region of the textile to which the pretreatment liquid is applied.

17. A recording method comprising:
    applying the pretreatment liquid according to claim 5 to a textile; and
    applying by an ink jet method an ink composition containing a pigment to a region of the textile to which the pretreatment liquid is applied.

18. A recording method comprising:
    applying the pretreatment liquid according to claim 6 to a textile; and
    applying by an ink jet method an ink composition containing a pigment to a region of the textile to which the pretreatment liquid is applied.

19. The recording method according to claim 13, wherein the pretreatment liquid is applied by an ink jet method.

* * * * *